United States Patent
Minemura et al.

(10) Patent No.: US 6,611,479 B2
(45) Date of Patent: Aug. 26, 2003

(54) INFORMATION RECORDING AND REPRODUCING APPARATUS

(75) Inventors: Hiroyuki Minemura, Kokubunji (JP); Hidehiko Kando, Matsudo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/193,099

(22) Filed: Jul. 12, 2002

(65) Prior Publication Data

US 2002/0181348 A1 Dec. 5, 2002

Related U.S. Application Data

(62) Division of application No. 09/525,028, filed on Mar. 14, 2000.

(30) Foreign Application Priority Data

Mar. 18, 1999 (JP) .............................................. 11-073112

(51) Int. Cl.⁷ ................................................. G11B 7/00
(52) U.S. Cl. ..................................................... 369/44.31
(58) Field of Search ............................ 369/44.27, 44.28, 369/44.29, 44.31, 47.25, 53.28

(56) References Cited

U.S. PATENT DOCUMENTS 5,105,409 A * 4/1992 Kaku et al. ............... 369/44.31

FOREIGN PATENT DOCUMENTS

| JP | 6-211601 | 9/1994 |
| JP | 7-272297 | 10/1995 |

* cited by examiner

*Primary Examiner*—Nabil Hindi
(74) *Attorney, Agent, or Firm*—Antonelli, Terry, Stout & Kraus, LLP

(57) ABSTRACT

An information recording and reproducing apparatus for scanning with a laser beam along an information track on a recording medium. The information recording and reproducing apparatus has a track offset adjustment circuit to perform track offset adjustment during recording and to not perform track offset adjustment during reproduction.

2 Claims, 3 Drawing Sheets

INFORMATION RECORDING AND REPRODUCING APPARATUS

CROSS REFERENCE TO RELATED APPLICATION

This is a divisional of U.S. application Ser. No. 09/525,028, filed Mar. 14, 2000, the subject matter of which is incorporated by reference herein.

BACKGROUND OF THE INVENTION

This invention relates to an information recording and reproducing apparatus of the type which utilizes an information storing medium capable of recording information in response to a laser beam and relates in particular to an information recording apparatus for improving the error rate of dissimilar optical disks.

A method of tracking while passing a laser beam over an address information region when scanning the track of an optical recording medium having track address information at a position deviated from the track center is disclosed in Japanese Published Unexamined Patent Application Hei 7-272297.

In the next generation of recording mediums, such as a DVD-RAM having 4.7 gigabtyes of information on one side of a disk 120 millimeters in diameter, the information track pitch is less than one-half the diameter of the laser spot. When recording on an information track, however, a cross-erase phenomenon occurs, causing deterioration of data on adjacent tracks. The cross-erase phenomenon results from heat propagating to adjacent tracks during recording and crystallizing a portion of the amorphous marks formed on adjacent tracks. Offsets in the laser beam scanning position of the laser beam become substantial due to the cross-erase phenomenon. Therefore, in order to minimize the occurrence of this cross-erase phenomenon, the marks must be correctly formed at the center of the information track.

The optical disk recording medium, however, uses a plastic substrate so that slack or stretching radially along the disk is unavoidable due to stress and changes which occur over time. The disk at this time develops a radial tilt relative to the center axis of the laser beam. In tracking control typically using the push-pull method, an offset is issued from a track detection signal relative to the radial tilt. The radial tilt must be maintained within a fixed amount in order to ensure compatibility with other optical disks.

BRIEF SUMMARY OF THE INVENTION

In view of the problems in the prior art due to cross-erase and radial tilt on high density optical disks and the need for optimal track control conditions during recording and reproduction, this invention therefore has the object of providing an information recording and reproducing apparatus that prevents cross-erase during recording and also improves the reproduced signal that is susceptible to deterioration accompanying the occurrence of radial tilt.

To achieve the above described objects of the invention and eliminate the problems in the prior art, the information recording and reproducing apparatus is configured as follows.

Firstly, an information recording and reproducing apparatus for scanning with a laser beam along an information track and recording and reproducing information is comprised of a tracking servo circuit which operates to position said information tracking laser beam; a track center detector circuit which operates to detect deviations between the scanning position of the laser beam and the center of the information track; a track center compensator circuit for supplying a track offset signal obtained from the track center detector circuit to the tracking servo circuit, to offset (correct) the scanning position of the laser beam; and a switching circuit to selectively control the supply of the track offset signal to the track offset circuit, which switching circuit is switched on and off depending on the operations being performed.

Secondly, the information recording and reproducing apparatus is characterized by the fact that the switching circuit is turned on when the apparatus is recording information.

Thirdly, the information recording and reproducing apparatus is characterized by the fact that the switching circuit is turned off when a data error has occurred during reproduction of information.

DETAILED DESCRIPTION OF THE INVENTION

Hereafter, a detailed description of the embodiments of the invention will be presented with reference to the accompanying drawings.

First, a disk with a 120 mm diameter and 5 gigabyte storage capacity was prepared based on a DVD-RAM format with a track pitch of approximately 0.6 $\mu$m. Then, recording and reproducing were performed on this disk with the DVD-RAM head (wavelength 650 nm, nominal aperture 0.6), and the cross-erase and jitter during reproduction were measured.

Figure 2:
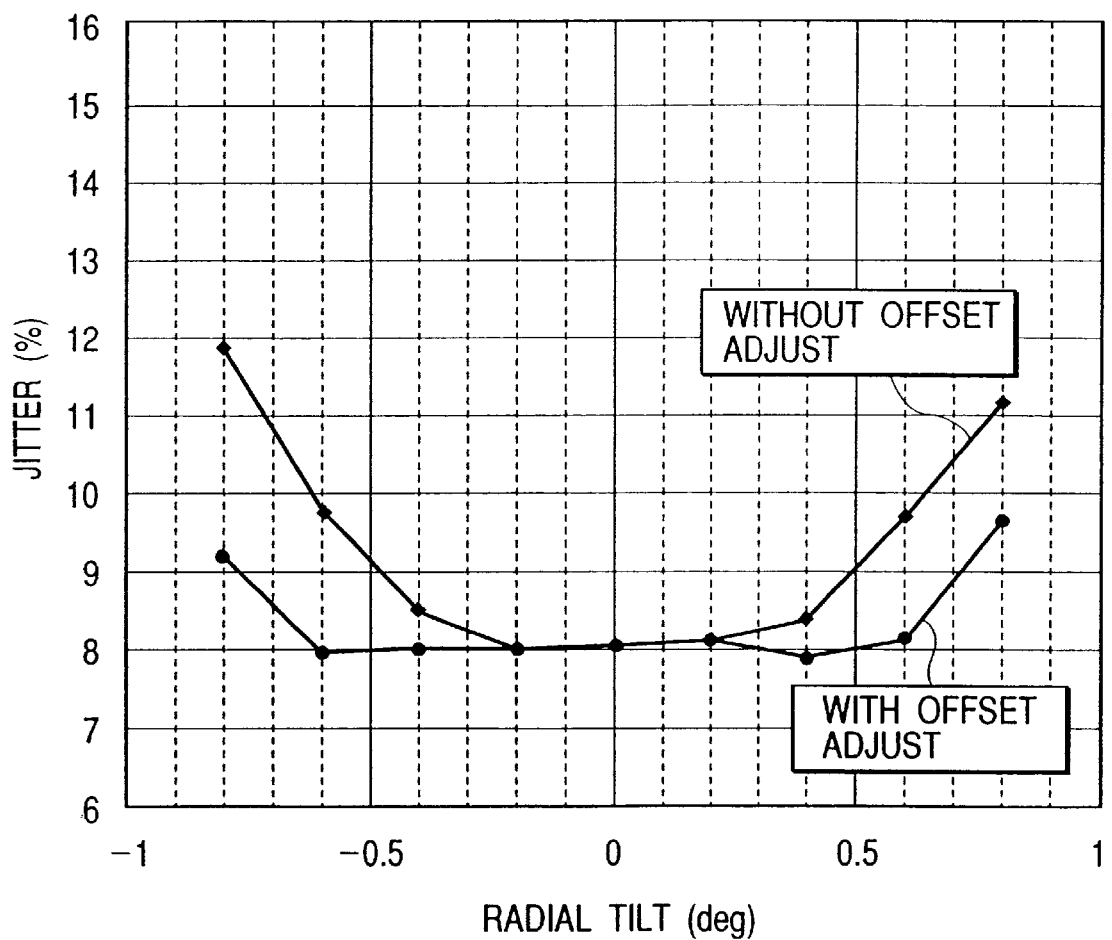
FIG. 2 is a graph showing the relation of radial tilt to cross-erase.

The relation of radial tilt to cross-erase is shown in FIG. 2. Here, cross-erase was evaluated by recording information on a particular target track, while making 10,000 consecutive recordings on both of the adjacent tracks, and then the jitter on the target track was measured after erasing the adjacent tracks.

To evaluate track offset, the header marks, formed by wobbling at equal distances from the left and right at equal distances from the center of the track on the record medium were utilized. The reflected optical signals from these header marks were aligned to have equal amplitudes to perform track offset adjustment. Examples both with and without offset adjustment are shown in the figure. Results confirmed that adjusting the track offset reduced the increase in jitter occurring due to cross-erase.

Figure 3:
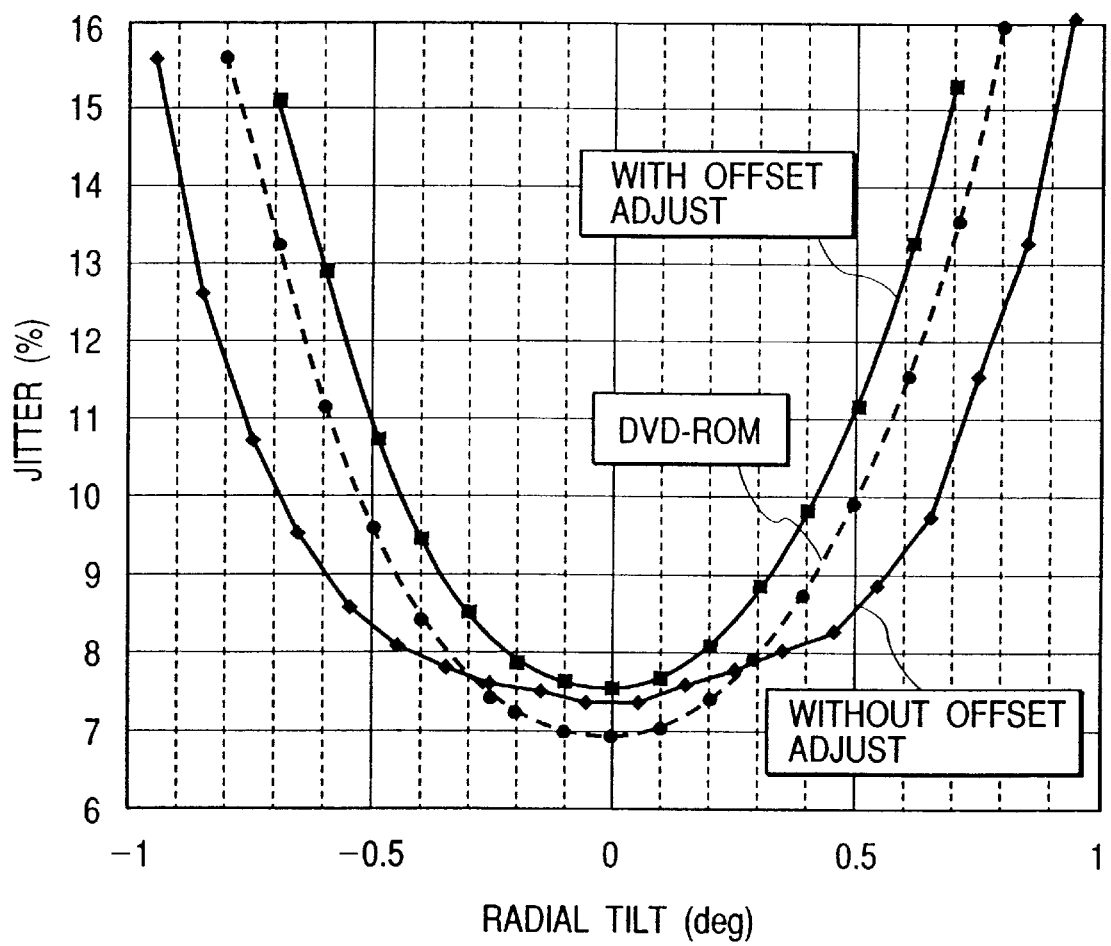
FIG. 3 is a graph showing the relation of playback jitter to radial tilt.

The relation of radial tilt to jitter during reproduction is shown in FIG. 3. The figure shows characteristics both with and without offset adjustment in the DVD-ROMs evaluated in the same device as a reference. During reproduction (or playback), it was confirmed that adjusting the track offset operated to narrow the reproduction margin versus radial tilt. The reason for this can be explained as follows. The aggravated jitter due to radial tilt is due to crosstalk and the crucial factor here is the shape of the side lobe of the laser spot. The main lobe of the laser beam however is adjusted by track offset detection to a position at the center of the track. So when the main lobe is positioned at the center of the track, the imbalance in the side lobe becomes large, with the result that crosstalk increases. If track offset adjustment is not performed, cross talk is canceled out due to the structure of the land grooves, so that a radial tilt margin greater than the DVD-ROM is obtained.

The above evaluation therefore clearly showed that:

1) Offset adjustment is effective in reducing cross-erase during recording.
2) Not performing offset adjustment is effective in reducing cross talk during reproduction (or playback).

Therefore, having an information recording and reproducing apparatus with a track offset adjustment circuit, in which the adjustment circuit is turned on and off as during recording and reproduction, respectively, will prove effective.

Figure 1:
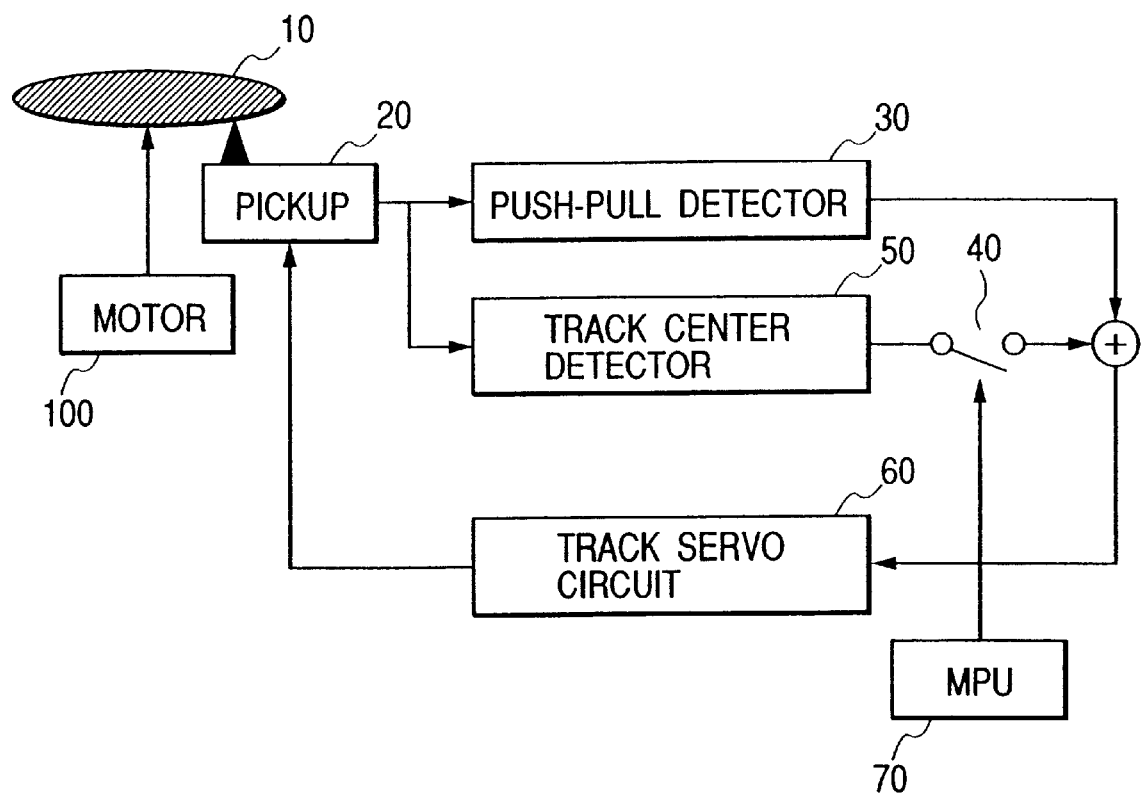
FIG. 1 is a block diagram showing the tracking control circuit of the information recording and reproducing apparatus of this invention.

A typical structure of the tracking system for an information recording and reproducing apparatus to implement this invention is shown in FIG. 1. An optical disk medium 10 in the figure is rotated by a motor 100 and a laser beam is emitted by an optical pickup 20. The push-pull signal acquired from the optical pickup by a push-pull detector 30 is input to a track servo circuit 60 and tracking control of the laser beam is implemented. Therefore, in contrast to conventional tracking servo systems, the information recording and reproducing apparatus of this invention has a track center detector 50, applies a push-pull signal, and further sums the push-pull and detector signals to turn the switch 40 on and off by commands issued from an MPU70. The track offset adjustment circuit is comprised of the push-pull detector 30, the track servo circuit 60, the track center detector 50, the MPU70 and the switch 40. The track center detector utilizes a method of equalizing the amplitudes of the header signals formed by wobbling as described above. Signal summing may be used according to how mounted in the apparatus or a high speed push-pull signal expanded to the bandwidth of the reproduced (playback) signal may be utilized.

The switch 40 is controlled as follows to achieve at least one of the indicated results listed.

(1) Switch 40 is turned on during recording to prevent an increase in cross-erase.
(2) Switch 40 is turned on during recording with verify, and verify is then strictly implemented when there is little reproduction tolerance due to radial tilt.
(3) Switch 40 is turned off during reproduction to expand the reproduction tolerance.
(4) Switch 40 is basically turned on during repeated recording and reproducing, and along with preventing an increase in cross-erase, when an error has occurred during reproduction, turns off during a retry of reproduction in order to expand the reproduction tolerance.

Besides the above, there are many other potential control methods for switch 40. The main approach in accordance with this invention is to provide a configuration which operates to turn the track offset adjustment on and off to improve the reliability and performance of recording and reproduction (playback).

The words "during recording" in this specification refer to a mode of recording data onto a recording medium, and the words "during playback" refer to a mode for read-out (or loading) data recorded on a readable area of the recording medium.

This invention therefore proposes a high reliability, high performance information recording and reproducing apparatus that expands the reproducing margin versus cross-erase and crosstalk on high density optical disks.

What is claimed is:

1. An information recording and reproducing apparatus for scanning with a laser beam along an information track on a recording medium, wherein said information recording and reproducing apparatus has a track offset adjustment circuit to perform track offset adjustment during recording and to not perform track offset adjustment during reproduction.

2. An information recording and reproducing apparatus according to claim 1, wherein said track offset adjustment circuit performs track offset adjustment by means of a signal acquired during scanning of wobbled marks at equal distances on left and right of the center of the track or said recording medium.

* * * * *